Figure 10:
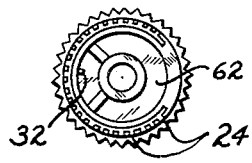

Aug. 8, 1961 J. A. GITS 2,994,925
METHODS OF MAKING MOLDED ARTICLES
Filed March 31, 1952 2 Sheets-Sheet 1
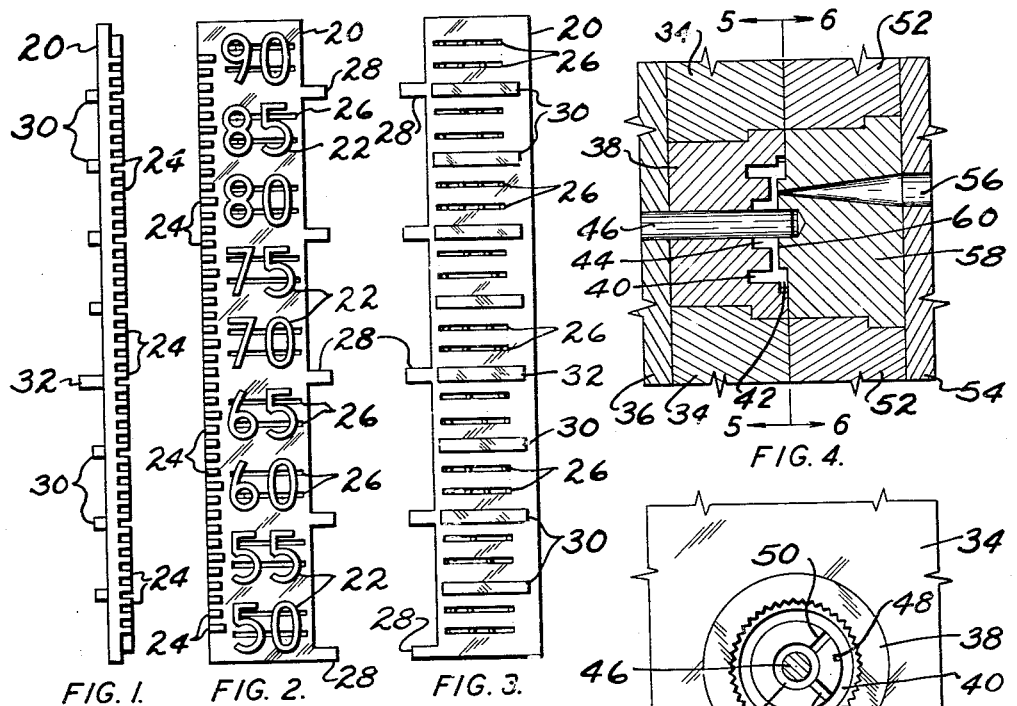
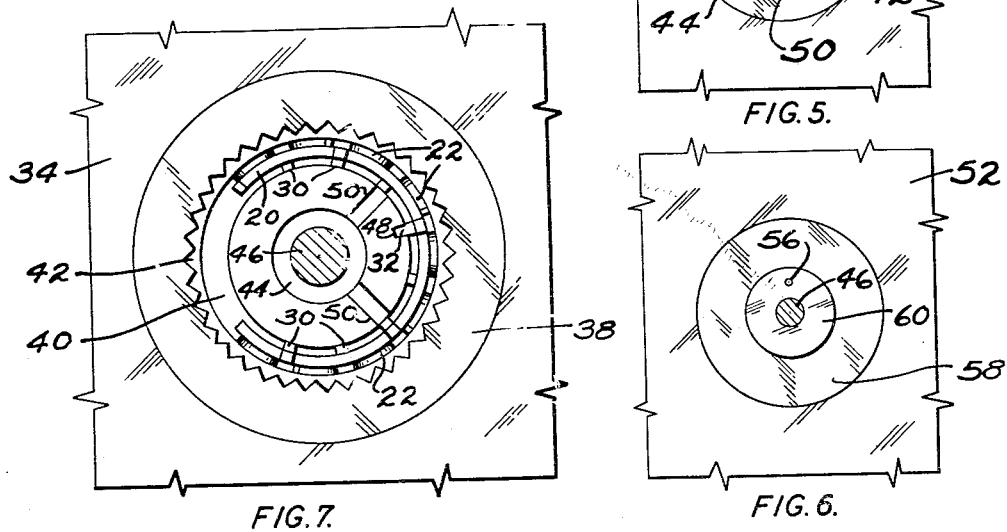
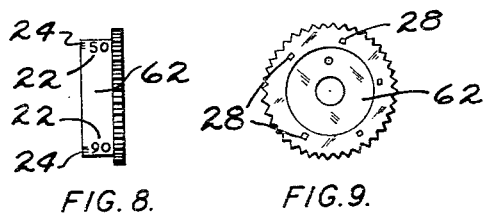
INVENTOR.
Joseph A. Gits
BY Rey Eilers
ATTORNEY.

Aug. 8, 1961 J. A. GITS 2,994,925
METHODS OF MAKING MOLDED ARTICLES
Filed March 31, 1952 2 Sheets-Sheet 2

INVENTOR.
Joseph A. Gits
BY
Roy Eilers
ATTORNEY.

United States Patent Office 2,994,925
Patented Aug. 8, 1961

2,994,925
METHODS OF MAKING MOLDED ARTICLES
Joseph A. Gits, 1424 Bonnie Brae, River Forest, Ill., assignor of one-half to Jules P. Gits, Chicago, Ill.
Filed Mar. 31, 1952, Ser. No. 279,504
20 Claims. (Cl. 18—59)

This invention relates to improvements in methods of making molded articles. More particularly, this invention relates to improvements in methods of making articles which have indicia molded therein.

It is therefore an object of the present invention to provide an improved method of making an article which has indicia molded therein.

It is frequently desirable to provide articles which have numerals, letters, or other indicia therein. While such indicia could be formed with paint, it has been found that paint tends to chip and crack. In addition, painting must usually be done manually, and manual operations unduly increase the cost of articles. For these reasons, the use of paint in forming indicia on articles is not satisfactory. In recognition of this, certain methods of molding indicia-containing articles have been invented; among which are the methods disclosed in United States Patents Nos. 2,285,963; 2,288,187; 2,298,364; and 2,298,365 granted to Joseph A. Gits and Jules P. Gits. These latter methods have proved to be eminently satisfactory in making indicia-containing articles where the indicia are part of or project upwardly from flat surfaces. However, in those instances where the indicia of the articles are to form part of or project upwardly from arcuate surfaces, it has been found that undue costs are experienced.

The present invention minimizes such costs by providing a new concept of molding arcuate indicia-containing surfaces. Instead of molding an arcuate plate with raised indicia thereon, the present invention molds a flat plate with raised indicia thereon, and then bends that plate to the desired arcuate configuration. In doing so, the present invention obviates all need of bulky, complicated and expensive molds with radially-movable indicia-forming segments. In addition, the present invention obviates the die marks formed upon the articles by the segments of the dies; and thus eliminates the expensive operations needed to remove those marks. It is therefore an object of the present invention to provide a method of making arcuate, indicia-containing surfaces by forming flat indicia-defining plates and then bending those plates to the desired arcuate configuration.

The indicia-defining plate provided by the present invention will be bent to the desired arcuate configuration and will then have a fluidized material combined with it. This fluidized material will solidify and complete the desired article; maintaining the desired configuration of the plate as it does so. This fluidized material will preferably have a color that is different from the color of the plate; and in such instances that material will accentuate the details of the indicia defined by the plate.

The indicia-defining plate provided by the present invention must be held in a mold with considerable precision so the fluidized material will assume the required position relative to that plate. Precision holding of the indicia-defining plate is assured in the present invention by providing yieldable projections at one side of the plate. These projections make the overall width of the plate slightly greater than the width of the cavity in the die that receives the plate and the fluidized material. As the cavity is closed, the projections will initially cause the other side of the plate to be pressed tightly against the side of the cavity, and will secondarily yield to create a biasing force that continues to hold that other side of the plate against that side of the cavity. It is therefore an object of the present invention to provide an indicia-defining plate with yieldable projections at one side thereof that make the overall width of said plate greater than the width of the cavity in which said plate and fluidized material are to be united.

Other and further objects and advantages of the present invention should become apparent from an examination of the drawing and accompanying description.

In the drawing and accompanying description, several preferred methods of making molded articles are shown and described but it is to be understood that the drawings and accompanying description are for the purpose of illustration only and do not limit the invention and that the invention will be defined by the appended claims.

Figure 11:
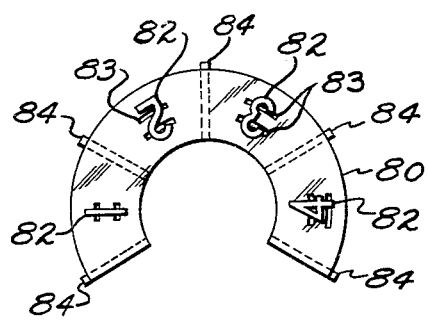
Figure 12:
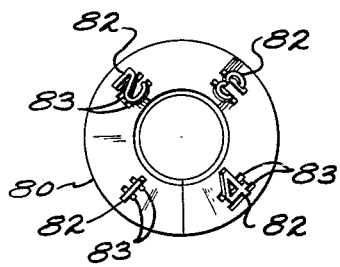
Figure 13:
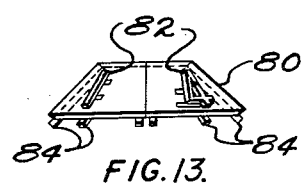
Figure 14:
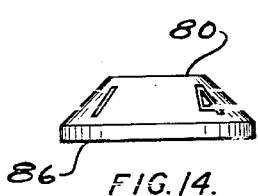

In the drawing FIG. 1 is an elevational view of a flat plate which is made in accordance with the principles and teachings of the present invention, FIG. 2 is a front elevational view of the plate shown in FIG. 1, FIG. 3 is a rear elevational view of the plate shown in FIG. 1 and 2, FIG. 4 is a cross-sectional side view of a mold in which the plate of FIGS. 1–3 is united with fluidized material, FIG. 5 is a front elevational view of the female portion of the mold of FIG. 4, FIG. 6 is a front elevational view of the male portion of the mold of FIG. 4, FIG. 7 is a front elevational view, on a larger scale, of the female portion of the mold shown in FIG. 5 as that portion of the mold receives the plate of FIGS. 1–3, FIG. 8 is a side elevational view of a counterwheel incorporating the plate of FIGS. 1–3, and this view is on a smaller scale, FIG. 9 is a rear elevational view of the counterwheel of FIG. 8, FIG. 10 is a front elevational view of the counterwheel of FIG. 8, FIG. 11 is a plan view of another plate that is made in accordance with the principles and teachings of the present invention, FIG. 12 is a plan view of the plate of FIG. 11 as that plate has been bent to form a truncated cone, FIG. 13 is a side elevataional view of the plate of FIG. 11 and 12 as it appears when in the form of a truncated cone, and FIG. 14 is a side elevational view of the plate of FIGS. 11–13 after fluidized material has been united with it.

Referring to the drawing in detail, the numeral 20 denotes a flat plate which is formed of a flexible plastic material. Such material will preferably be a thermoplastic material. Materials which are currently referred to as plastics and which are of the cellulose, vinyl, or butyrate families have been found to work quite well. The plate 20 has indicia 22 thereon and in the case of the plate shown in the drawing, the indicia consists of the numerals 50, 55, 60, 65, 70, 75, 80, 85 and 90. These indicia 22 project upwardly from the surface of the plate 20 and define a surface spaced above the surface of that plate. Interpolative projections 24 are formed at the left hand edge of the plate 20. The interpolative projections are of two lengths; most of the projections being short and every fifth projection being long. The long projections are in register with the numerals 50 through 90 while the short projections are disposed between the long projections and thus between the numerals 50 through 90. The long projections 24 correspond to the numerals and the short projections correspond to integral divisions between the indicia 22.

Elongated openings 26 extend through the plate 20 and underlie the indicia 22. These openings 26 extend transversely of the plate 20 and extend parallel to the axis of bending of the plate 20. The openings 26 underlie each area encircled and bounded by portions of the indicia 22. A plurality of projections 28 extend outwardly from the right hand side of the plate 20. These projections have relatively small cross sections and are thus yieldable under forces directed against the plate 20 in the plane of that plate. A plurality of projections 30 extend rearwardly from the plate 20 and those projections are in register with the spaces between the indicia 22. Thus the projections 30 are spaced from the openings 26. A projection 32 extends rearwardly from the plate 20, and that projection is longer than the projections 30. This projection constitutes an indexing projection for the plate 20.

The plate 20 together with its indicia 22, its interpolative projections 24, its openings 26, its projections 28, its rear projections 30 and its indexing projection 32 is readily formed in a mold for plastic materials. Appropriately formed recesses can be made in the male and female portions of a flat mold and the plastic material suitably injected into the mold. This construction of the plate 20 enables the male portion of the mold to be made as one piece and enables the female portion of the mold to be made as one piece. This is an important contrast to prior molds for articles which had indicia in the surfaces thereof and which had arcuate surfaces.

Once the plates 20 have been formed, they are inserted in the female portions of molds. Those female portions are carried in mold plates such as the mold plates 34 of FIGS. 4, 5 and 7. A back plate 36 is secured to the mold plate 34 and the inner end of the female portion 38 will abut the back plate 36. The female portion 38 of the mold has an annular recess 40 therein and that annular recess is concentric with the female portion 38 of the mold. A shallow recess 42 of annular configuration abuts the annular recess 40, and the recess 42 is adjacent the outer end of the female portion 38 of the mold. The recess 42 has teeth at the periphery thereof. The female portion 38 of the mold has a small diameter recess 44 at the center thereof, and the recesses 40 and 44 define an annular island between them. The top of this annular island is spaced outwardly of the inner face of the female portion 38 of the mold. An opening at the center of the female portion 38 of the mold receives a bore-defining rod 46, and that rod extends through the recess 44 of the female portion 38. A notch 48 is formed in the annular island defined by the recesses 40 and 44, and that notch is dimensioned to receive the inner end of the indexing projection 32 on the plate 20. Two strut-defining grooves 50 are formed in the island which is defined by the recesses 40 and 44. These grooves 50 extend radially outwardly through that island. The annular recess 40 is dimensioned so the plate 20 can fit within it as shown in FIG. 7. The indicia 22 will press tightly against the concave wall of the recess 40 and the rear projections 30 will press against the convex wall of that recess. The width of the recess 40 is such that the engagement of the rear projections 30 against the convex wall of that recess will hold the indicia 22 immediately adjacent the concave wall of that recess.

A mold plate 52, which is engageable with the mold plate 34, carries a male portion 58 of the mold. This male portion will be held in assembled relation with the mold plate 52 by the back plate 54. A gate 56 is provided in the back plate 54 and in the male portion 58 of the mold to conduct fluidized material to the surface of the male portion 58 of the mold. That male portion has a projecting center 60 of circular configuration, and the gate 56 opens to that circular center. The male portion 58 of the mold has a centrally located recess which receives the end of the bore-defining rod 46.

In using the mold illustrated in FIGS. 4–7 the plate 20 is inserted within the annular recess 40 so its indicia 22 bear against the concave wall of that recess and so the projections 30 bear against the convex wall of that recess, and so the indexing projection 32 fits within the notch 48 in the island between recesses 40 and 44. The projections 28 are of such length that they make the overall width of the plate 20 greater than the depth of the annular recess 40. Consequently, the ends of the projections 28 extend slightly above the plane defined by the mold plate 34 and the female portion 38 of the mold. Thereafter, the mold plate 52 is placed in register with the mold plate 34 so the recess in the center of the male portion 58 of the mold receives and telescopes over the bore-defining rod 46. The inner face of the male portion 58 will engage the ends of the projections 28 and momentarily hold the adjacent faces of the female portion 38 and the male portion 58 of the mold apart. Sufficient pressure will thereafter be applied to the back plates 36 and 54 to force the projections 28 to yield; those projections initially forcing the left hand edge of the plate 20 into tight and intimate engagement with the bottom of the recess 40, and secondarily yielding to create a biasing force which holds that left hand edge of the plate 20 in continuous intimate engagement with the bottom of the recess 40. Thereafter, fluidized material is forced under pressure into the gate 56. This material may be a thermoplastic or a thermosetting material, and most thermoplastic and thermosetting materials now in use can be utilized. Preferably, the fluidized material will have a color which is different from the color of the plate 20. Where that is the case, the fluidized material accentuates the configuration of the indicia on the plate 20. That indicia will not only include the numerals 50 through 90 but will also include the interpolative projections 24.

The fluidized material will flow inwardly through the gate 56 and enter the cavity defined by the female portion 38 and the male portion 58 of the mold. That material will begin to move outwardly and inwardly of that cavity. The portion of the material which moves outwardly will engage the rear surface of the plate 20 and force that plate to conform even more intimately and even more closely to the concave wall of the recess 40. The engagement between the indicia 22 and the interpolative projections 24 with the concave wall of the recess 40 will be made so intimate that no part of the fluidized material will be able to force its way between the concave wall of the recess 40 and the surfaces of those indicia and those projections. However, the fluidized material will be able to flow through the openings 26 and through the space between adjacent projections 28 and thus flow to the convex surface of the plate 20. The fluidized material will then flow in and around the spaces between the projections 24 and the indicia 22 and will also fill any areas bounded by the indicia 22. Specifically, fluidized material will flow through the openings 26 into the areas defined by the zero, the 6, the 8, and the 9 of the plate 20, as well as flowing into the areas around the indicia 22. The fluidized material will thus anchor itself to the plate 20 by being on both front and rear surfaces of that plate and by extending through openings in that plate and at one edge of that plate. The fluidized material will also flow into the recess 42 and into the recess 44. Moreover, the fluidized material will fill the grooves 50 in the island between the recesses 40 and 44. As a result, the completed article will have a central bore, a central hub, a web projecting radially outwardly from that hub, an arcuate face which contains indicia in the form of numerals and interpolative projections, and a toothed, radially extending flange. The indicia 22 and the interpolative projections 24 will form part of the arcuate surface of the completed article 62, and the ends of the projections 28 will extend to the surface of the finished article 62.

The numeral 80 denotes another plate that is made in accordance with the principles and teachings of the present invention. That plate has upwardly extending indicia 82 thereon. In the particular plate shown the indicia are the numerals "1" through "4." Slots 83 are provided in the plate 80 adjacent the indicia 82 to permit fluidized material adjacent the rear of plate 80 to pass through to the front of plate 80, and to fill the area defined by the "4" as well as the areas around the indicia 82. The indicia 82 could be letters or fanciful figures, and numerals are shown merely for simplicity and clarity of presentation. A plurality of radially extending projections 84 are formed on the underside of plate 80. The plate 80 will preferably be formed of a flexible thermoplastic material of the type used in forming the plate 20. The plate 80 is arcuate in configuration but it is molded while it is flat. Thus inexpensive molding apparatus and procedures can be used in forming the plate 80. That plate has the form of an incomplete annulus, and the ends thereof lie on radii. The plate 80 can be bent to form a truncated cone, as indicated particularly in FIGS. 12 and 13. A mold of complementary configuration to the truncated configuration will be provided to receive the plate 80 and hold it in that form. When the plate 80 is in the form of a truncated cone, the projections 84 will extend downwardly below the bottom of that cone. These projections will engage the other portion of the mold and will act to force the plate 80 into intimate engagement with the abutting surface of the mold. As in the case of the projections 28, the projections 84 will first insure an intimate engagement between the plate and the mold and will then yield to hold that plate in intimate engagement with the mold. Once the plate 80 has been positioned within the mold, fluidized material can be introduced into the mold. That fluidized material will engage the rear surface of the plate 80 and force the front surface of that plate into even more intimate engagement with the surface of the mold. That fluidized material will pass through the slots 83 and fill the area defined by the "4" as well as the areas around the indicia 82. This material will conceal the joint formed by the two ends of plate 80. As FIG. 14 indicates, the completed article, which is denoted by the numeral 86, will have a smooth configuration throughout.

In applying the fluidized material to the indicia-defining plates, it is necessary that the fluidized material be permitted to harden and solidify before the molds are opened. Where this is done, the fluidized material will positively maintain the plates in the arcuate position which they were caused to assume in the mold.

Whereas two preferred embodiments of the present invention have been shown and described in the drawing and accompanying description, it should be apparent to those skilled in the art that various changes may be made in the form of the invention without affecting the scope thereof.

What I claim is:

1. The method of forming a smooth-faced annular body, which has an arcuate, indicia-containing surface, that comprises forming a plate of flexible material so it has a generally flat outer face and so it has indicia-defining surfaces that are normal to said outer face, bending said plate until it has an arcuate configuration and the said outer face thereof is convex plastic, bringing fluidized material into engagement with said plate and with the said indicia-defining surfaces thereof, and holding said material in engagement with said plate and with the said indicia-defining surfaces thereof until said material hardens to complete said body by becoming integral with and inseparable from said plate and the said indicia-defining surfaces thereof said indicia-defining surfaces extending to the smooth face of said body.

2. The method of forming a smooth-faced annular body, which has an arcuate, indicia-containing surface, that comprises forming a plate of flexible plastic material so it has a generally flat outer face and so it has indicia-defining surfaces that are normal to said outer face, bending said plate until it has an arcuate configuration and the said outer face thereof is convex, bringing fluidized material into engagement with said plate and with the said indicia-defining surfaces thereof, and holding said material in engagement with said plate and with the said indicia-defining surfaces thereof until said material hardens to complete said body by becoming integral with and inseparable from said plate and the said indicia-defining surfaces thereof, said indicia-defining surfaces extending to the smooth face of said body, said plate initially being flat.

3. The method of forming a smooth-faced annular body, which has an arcuate, indicia-containing surface, that comprises forming a plate of flexible plastic material so it has a generally flat outer face and so it has indicia-defining surfaces that are normal to said outer face, bending said plate until it has an arcuate configuration and the said outer face thereof is convex, bringing fluidized material into engagement with said plate and with the said indicia-defining surfaces thereof, and holding said material in engagement with said plate and with the said indicia-defining surfaces thereof until said material hardens to complete said body by becoming integral with and inseparable from said plate and the said indicia-defining surfaces thereof, said indicia-defining surfaces extending to the smooth face of said body, said plate initially having indicia projecting upwardly from the said outer face thereof.

4. The method of forming a smooth-faced annular body, which has an arcuate, indicia-containing surface, that comprises forming a plate of flexible plastic material so it has a generally flat outer face and so it has indicia-defining surfaces that are normal to said outer face, bending said plate until it has an arcuate configuration and the said outer face thereof is convex, bringing fluidized material into engagement with said plate and with the said indicia-defining surfaces thereof, and holding said material in engagement with said plate and with the said indicia-defining surfaces thereof until said material hardens to complete said body by becoming integral with and inseparable from said plate and the said indicia-defining surfaces thereof, said indicia-defining surfaces extending to the smooth face of said body, said plate having openings therethrough to permit said material to engage the concave and convex surfaces of said plate.

5. The method of forming a smooth-faced annular body, which has an arcuate, indicia-containing surface, that comprises forming a plate of flexible plastic material so it has a generally flat outer face and so it has indicia-defining surfaces that are normal to said outer face, bending said plate until it has an arcuate configuration and the said outer face thereof is convex, bringing fluidized material into engagement with said plate and with the said indicia-defining surfaces thereof, and holding said material in engagement with said plate and with the said indicia-defining surfaces thereof until said material hardens to complete said body by becoming integral with and inseparable from said plate and the said indicia-defining surfaces thereof, said indicia-defining surfaces extending to the smooth face of said body, said indicia including numerals and interpolative projections adjacent said numerals, said interpolative projections and said numerals defining a said outer face spaced outwardly from the surface of said plate.

6. The method of forming a body, which has an arcuate, indicia-containing surface, that comprises forming an indicia-defining plate of flexible material, bending said plate until it has an arcuate configuration, bringing fluidized material into engagement with said plate, and holding said material in engagement with said plate until said material hardens to complete said body, said plate having a plurality of yieldable projections extending from the side thereof which can urge the opposite side of said plate tightly against the wall of a mold.

7. The method of forming a body, which has an arcuate, indicia-containing surface, that comprises forming a plate of flexible plastic material with indicia extending from the front thereof, bending said plate until it has an arcuate configuration, bringing fluidized material into engagement with said plate, and holding said material in engagement with said plate until said material hardens to complete said body, said plate having a plurality of projections extending from the rear thereof.

8. The method of forming a body, which has an arcuate, indicia-containing surface, that comprises forming an indicia-defining plate of flexible material, bending said plate until it has an arcuate configuration, bringing fluidized material into engagement with said plate, and holding said material in engagement with said plate until said material hardens to complete said body, said plate having a plurality of projections extending from the rear thereof, said projections being narrower than said plate, whereby fluidized material can flow along the rear of said plate past the ends of said projections.

9. The method of forming a body, which has an arcuate, indicia-containing surface, that comprises forming an indicia-defining plate of flexible material, bending said plate until it has an arcuate configuration, bringing fluidized material into engagement with said plate, and holding said material in engagement with said plate until said material hardens to complete said body, said plate having a plurality of elongated openings therethrough, said openings underlying and extending beyond said indicia.

10. The method of forming a body, which has an arcuate, indicia-containing surface, that comprises forming an indicia-defining plate of flexible material, bending said plate until it has an arcuate configuration, bringing fluidized material into engagement with said plate, and holding said material in engagement with said plate until said material hardens to complete said body, said plate having a plurality of elongated openings therethrough, said openings being parallel to the axis of bending of said plate.

11. The method of forming of body, which has an arcuate, indicia-containing surface, that comprises forming an indicia-defining plate of flexible material, bending said plate until it has an arcuate configuration, bringing fluidized material into engagement with said plate, and holding said material in engagement with said plate until said material hardens to complete said body, said plate initially having indicia projecting upwardly from one surface thereof, said plate having openings therethrough to permit fluidized material to flow from below said plate into the space around said indicia.

12. Method of manufacturing bodies having at least one substantially smooth cylindrical composite surface, which surface bears a plurality of symbols therein, comprising the steps of preparing at least one resilient strip of symbol bodies connected with each other, each of said bodies having a substantially flat face adapted for forming part of said cylindrical composite surface, inserting said strip in a mold having at least one cylindrical molding surface so as to lie with said flat faces of said symbols against said cylindrical molding surface, and feeding moldable material into said mold to form a body embedding said strip, including the same to form an integral body therewith, and being provided with said cylindrical composite surface composed of the flat faces of said bodies and the remaining part of cylindrical composite surface being formed by said moldable material.

13. In the method according to claim 12, feeding a moldable material of a color which contrasts with that of the strip into said mold.

14. In the method according to claim 12, providing the strip with positioning means, and inserting same in a mold provided with complementary means to ensure exact positioning of the strip in the mold.

15. In the method according to claim 12, centrally charging the mold with softened plastic material to cause the plastic to press the strip firmly against the mold circumference.

16. Method of manufacturing bodies having at least one substantially smooth cylindrical composite surface bearing a plurality of symbols therein which includes preparing a connected series of symbol bodies, each of said bodies having a substantially flat face adapted for forming said cylindrical composite surface, said bodies being connected by at least one resilient bridge, inserting said bridge-connected series circumferentially in a mold having at least one cylindrical molding surface so that said flat faces lie flush with said cylindrical molding surface, and then feeding a moldable material into the mold so as to form a composite body with said bridge-connected series of symbols, which body has at least one substantially smooth cylindrical composite surface, which surface is formed by said cylindrical molding surface, said body embedding said bridge-connected symbols to form an integral body therewith, said flat faces of said bodies forming part of the cylindrical composite surface of said body.

17. Method of manufacturing cylindrical bodies having a substantially smooth peripheral composite surface, which surface bears a plurality of symbols therein, comprising the steps of preparing a resilient strip of symbol bodies connected with each other, each of said bodies having a substantially flat face adapted for forming part of said cylindrical composite surface, inserting said strip in a mold having a cylindrical cavity so as to lie with said flat faces of said bodies against the cylindrical wall of said cavity, and feeding moldable material into said cavity to form a cylindrical body embedding said strip and including the same to form an integral body therewith, the cylindrical surface of which body comprises the flat faces of said bodies so as to form said substantially smooth composite surface.

18. Method of manufacturing cylindrical bodies having at least one substantially smooth cylindrical composite surface bearing a plurality of symbols therein which includes preparing a connected series of symbol bodies, each of said bodies having a substantially flat face adapted for forming said cylindrical composite surface, said bodies being connected by at least one resilient bridge, inserting said bridge-connected series circumferentially in a mold having a cylindrical cavity so that said flat faces lie flush with the cylindrical wall of said cavity, and then feeding a moldable material into the mold so as to form a cylindrical composite body with said bridge-connected series, the surface of which is formed by said cylindrical wall, said body embedding said bridge-connected symbols to form an integral body therewith, said flat faces of said bodies forming part of the cylindrical composite surface of said body.

19. In the method according to claim 12, inserting said strip in a mold provided with collar-shaped rims to cover parts of the strip to make them invisible upon assembling two such bodies one adjacent the other.

20. Method of manufacturing bodies having at least one substantially smooth cylindrical composite surface, which surface bears a plurality of symbols therein, comprising the steps of preparing at least one resilient strip of symbol bodies connected with each other, each of said bodies having a substantially flat face adapted for forming part of said cylindrical composite surface, inserting said strip in a mold having at least one cylindrical molding surface, said substantially flat faces of said bodies assuming a curvature corresponding to the circumference of said cylindrical molding surface so as to lie with said flat faces of said symbols against said cylindrical molding surface, and feeding moldable material into said mold to form a body embedding said strip, including the same to form an integral body therewith, and being provided with said cylindrical composite surface composed of the flat faces of said bodies and the remaining part of cylindrical composite surface being formed by said moldable material.

(References on following page)

References Cited in the file of this patent

UNITED STATES PATENTS

| | | |
|---|---|---|
| 423,002 | Van Dyke | Mar. 11, 1890 |
| 1,319,107 | Novotny | Oct. 21, 1919 |
| 1,377,506 | Novotny | May 10, 1921 |
| 1,377,519 | Novotny | May 10, 1921 |
| 2,001,491 | Hendey | May 14, 1935 |
| 2,288,187 | Gits | June 30, 1942 |
| 2,298,365 | Gits | Oct. 13, 1942 |
| 2,361,139 | White | Oct. 24, 1944 |
| 2,485,323 | Schwartz | Oct. 18, 1949 |
| 2,720,681 | Danielson et al. | Oct. 18, 1955 |